PHOSPHOR AND METHOD OF MAKING

Costas Lagos, Danvers, Mass., assignor to Sylvania Electric Products Inc.
No Drawing. Filed May 6, 1968, Ser. No. 727,086
Int. Cl. C09k 1/36, 1/44
U.S. Cl. 252—301.4 P                1 Claim

ABSTRACT OF THE DISCLOSURE

In a process of preparing a europium activated yttrium phosphate vanadate phosphor, yttrium oxide is blended with stoichiometric amounts of an ammonium phosphate compound and a vanadium compound. Europium oxide is then added to the blend and the blend is fired in air at a temperature between 1100° C. and 1400° C. After cooling, the blend is pulverized to a powder and the powder is washed in a dilute acid.

BACKGROUND OF THE INVENTION

This invention relates to a method of making phosphors for arc discharge lamps.

DESCRIPTION OF THE PRIOR ART

Phosphors for arc discharge lamps comprise those materials which emit visible light when exposed to, and excited by, ultraviolet radiation. Some examples of commonly used phosphors are strontium pyrophosphate, calcium halophosphate and calcium tungstate. In fluorescent lamps such phosphors are coated on the inner surface of a transparent lamp envelope. Radiation from the arc discharge, principally the 2537 A. mercury line, excites the phosphor to emission of visible light.

Efficiency of a phosphor can be expressed in terms of the amount of light emitted per unit of electrical power consumed, that is to say, in lumens per watt. In order to provide low cost illumination, lamp manufacturers constantly seek brighter, more efficient phosphors for use in arc discharge lamps. However, such phosphors should also have good maintenance characteristics. Maintenance refers to the efficiency of a phosphor after a certain period of operation in relation to its original efficiency. The use of good maintenance phosphors prevents an undesirable diminution with time of the light output of arc discharge lamps in which they are employed.

Generally, in the preparation of such phosphors, an amount of anion in excess of the stoichiometric amount is used. For example, in one method of preparing the phosphor $YVO_4$:Eu, yttrium oxide and europium oxide are blended with ammonium vanadate ($NH_4VO_3$). The stoichiometric quantity of ammonium vanadate per mole of phosphor is one mole. However, an amount of ammonium vanadate greater than one mole is used in the blend, the excess being as much as 30 or 40%. The purpose of this excess is to facilitate the entry of the activating constituent (europium, in this example) into the crystal matrix or to act as a flux and thereby enhance crystal formation or to provide for any loss of anion that occurs by volatilization during the firing operation. To prevent excessive volatilization, firing temperatures are generally held below about 1000°. Of course the cation, that is, the ammonium group, is completely volatilized as ammonia during firing.

Because of the excess anion used, there is a great probability that unreacted anionic constituents will remain in the fired phosphor. Since such unreacted material discolors the phosphor and lowers its efficiency, it must be removed. Usually a strong alkali wash is required for effective removal. Great care is then needed to remove all traces of this strong alkali since any remaining alkali can be detrimental to lamp maintenance by, for example, reacting with mercury therein to form a dark deposit.

SUMMARY OF THE INVENTION

According to my invention, europium activated yttrium phosphate-vanadate, within certain compositional limits, is an efficient and useful phosphor. Expressed as $$Y(PO_4)_x(VO_4)_{1-x}: Eu_y$$

the value of $x$ (concentration of $PO_4^{-3}$) can vary from about 0.1 to 0.7 and the value of $y$ from about 0.01 to 0.1. Table I, below, shows the relative brightness of such phosphors for values of x from 0 to 1. The phosphors were all fired at 1300° C. and the Eu concentration in each was 0.05 mole.

TABLE I

| x: | Brightness, percent |
|---|---|
| 0 | 100.0 |
| 0.1 | 103.6 |
| 0.2 | 104.8 |
| 0.3 | 103.6 |
| 0.4 | 101.2 |
| 0.5 | 100.0 |
| 0.6 | 94.0 |
| 0.7 | 89.2 |
| 0.8 | 74.7 |
| 0.9 | 49.4 |
| 1.0 | 15.7 |

The above measurements were made on a plaque tester and the brightness standard was set at 100% for $x$ equals 0, that is, for the pure vanadate phosphor. It can be seen that maximum brightness occurs where $x$ has a value of 0.2, that is, for the composition $Y(PO_4)_{0.2}(VO_4)_{0.8}$:Eu. As the value of $x$ increases beyond 0.7, the brightness decreases in inceasingly greater increments. For the value of x equals 1, that is, for the pure phosphate phoshor, the brightness is only about one-sixth of the standard.

X-ray diffraction patterns of the above samples shows no change in the pattern of the $YVO_4$:Eu phosphor as the concentration of $PO_4^{-3}$ is increased, until a concentration of about 0.7 mol of $PO_4^{-3}$ is reached. At this point a small amount of $YPO_4$ is detected by X-ray diffraction; as the concentration of $PO_4^{-3}$ is increased towards the pure $YPO_4$, so does the concentration of detectable $YPO_3$ also increase. Above about a concentration of 0.7 mole of $PO_4^{-3}$, subsequent lamp efficiencies also decrease.

I have found that in the preparation of such phosphors, optimum brightness resulted when substantially the exact stoichiometric ratio of anion to cation was used in the formulation. The use of excess anion, as was usual in the preparation of such phosphors, resulted in a material that was discolored and yielded low brightness.

Furthermore, the maintenance of such phosphors was improved when they were washed, after firing, with a dilute acid, such as nitric or hydrochloric, in contrast to unwashed phosphors or phosphors washed with only the usual alkaline solution. Acid solutions have a concentration of about 2 milliliters of acid per liter of water proved satisfactory. Preferably, however, I follow the acid wash with a wash in a dilute ammoniacal solution, say, about 2 milliliters of ammonium hydroxide per liter of water.

When ammonium vanadate was used in the phosphor formulation as the raw material source of vanadium, a distinct increase in brightness was obtained in contrast to that obtained from vanadium oxide. The phosphor prepared from ammonium vanadate was 15% brighter than that prepared from vanadium oxide, when both phosphors were fired at 1300° C. At a firing temperature of 1100° C., the ammonium vanadate phosphor was about 10% brighter than the vanadium oxide phosphor.

In addition, the improvement in brightness with increased firing temperature was greater for the ammonium vanadate phosphor than for the vanadium oxide phosphor. A phosphor prepared from vanadium oxide and fired at 1400° C. had 7% higher brightness than the same phosphor fired at only 1100° C. In contrast, a phosphor prepared from ammonium vanadate and fired at 1400° C. had 23% higher brightness than the same phosphor fired at 1100° C.

Table II, below, shows the efficiencies and maintenance of fluorescent lamps operated up to 500 hours, utilizing phosphors prepared in accordance with this invention. The phosphors were prepared from ammonium vanadate, fired at temperatures of 1300° C. and were washed in dilute hydrochloric acid, followed by a wash in dilute ammoniacal solution.

TABLE II

| Phosphors | Efficiency in lumens per watt | | | Maintenance, percent | |
|---|---|---|---|---|---|
| | 0 hrs. | 100 hrs. | 500 hrs. | 100 hrs. | 500 hrs. |
| $Y(PO_4)_{0.5}(VO_4)_{0.5}$ | 39.3 | 36.6 | 33.2 | 93.1 | 84.5 |
| $Y(PO_4)_{0.6}(VO_4)_{0.4}$ | 39.9 | 37.3 | 35.0 | 93.5 | 87.7 |
| $Y(PO_4)_{0.7}(VO_4)_{0.3}$ | 39.9 | 36.3 | 34.2 | 93.1 | 87.7 |
| $Y(PO_4)_{0.8}(VO_4)_{0.2}$ | 34.6 | 32.2 | 30.7 | 93.0 | 88.7 |
| $Y(PO_4)_{0.9}(VO_4)_{0.1}$ | 28.3 | 26.4 | 25.0 | 93.2 | 88.3 |

The above table also shows the decrease in brightness that occurs when the $PO_4^{-3}$ concentration exceeds about 0.7, as previously mentioned. The europium concentration in the above phosphors was 0.05 mole. Below about 0.01 mole and above about 0.1 mole, the phosphor brightness decreased significantly.

Although the preferred sources for europium and yttrium are their oxides, other convenient materials can be used such as the nitrates or oxalates of yttrium and europium.

DESCRIPTION OF THE PREFERRED EMBODIMENT.—EXAMPLE I

In the preparation of $Y(PO_4)_{0.6}(VO_4)_{0.4}:Eu_{0.5}$, the following ingredients were dry blended for one hour in a mixer mill, with glass beads disposed therein to aid the blending:

| Ingredients | Moles | Grams |
|---|---|---|
| $Y_2O_3$ | 0.5 | 101.7 |
| $(NH_4)_2HPO_4$ | 0.6 | 71.3 |
| $NH_4VO_3$ | 0.4 | 42.05 |
| $Eu_2O_3$ | 0.025 | 7.92 |

After removing the glass beads, the mixture was fired in an air atmosphere for one hour at 1300° C. in a suitable container, such as a zircon boat. The container must be able to withstand the high firing temperature without reacting with the mixture. After cooling in air, the phosphor was pulverized and then passed through a 200 mesh sieve. The sieved material was then washed with a 0.2% solution of hydrochloric acid, followed by a wash in a 0.2% solution of ammonium hydroxide. After oven drying, the finished phosphor was ready for use in lamps. The efficiency and maintenance of the phosphor are shown in Table II.

EXAMPLE II

In the preparation of a similar phosphor, but using vanadium oxide instead of ammonium vanadate, the following ingredients were used:

| Ingredients | Moles | Grams |
|---|---|---|
| $Y_2O_3$ | 0.5 | 101.7 |
| $(NH_4)_2HPO_4$ | 0.6 | 71.3 |
| $V_2O_5$ | 0.2 | 36.4 |
| $Eu_2O_3$ | 0.025 | 7.92 |

The blending, firing and washing steps were the same as in Example I.

It is apparent that modifications may be made within the spirit and scope of the instant invention but it is my intention to be limited only by the scope of the appended claim.

I claim:

1. The process of preparing a europium-activated yttrium phosphate vanadate phosphor having the formula $Y(PO_4)_x(VO_4)_{1-x}:Eu_y$ where $x$ is between about 0.1 and 0.7 and $y$ is between about 0.01 and 0.1 comprising the steps of: blending yttrium oxide with stoichiometric amounts of ammonium phosphate and one of the group consisting of ammonium vanadate and vanadium oxide; adding europium oxide to the blend; firing the blend in air at a temperature of about 1400° C.; pulverizing the firing blend to a powder; washing the powder in hydrochloric acid solution having a concentration of about 0.2% and then washing in ammonium hydroxide solution having a concentration of about 0.2%; and drying the powder.

References Cited

UNITED STATES PATENTS 3,484,382  12/1969  Durkee _____ 252—301.4
3,380,926   4/1968  Harper _____ 252—301.4
3,417,027  12/1968  Wanmaker et al. ____ 252—301.4

ROBERT D. EDMONDS, Primary Examiner

U.S. Cl. X.R.

252—301.4 R